United States Patent Office 3,428,646
Patented Feb. 18, 1969

3,428,646
4-IMIDAZOLIDONES AND PROCESSES FOR PREPARING SAME
Joseph Hellerbach, Basel, Switzerland, assignor to Hoffmann-La Roche Inc., Nutley, N.J., a corporation of New Jersey
No Drawing. Filed Aug. 5, 1964, Ser. No. 387,807
Claims priority, application Switzerland, Aug. 12, 1963, 9,931/63; Jan. 22, 1964, 737/64
U.S. Cl. 260—309.7      13 Claims
Int. Cl. C07d 49/30

ABSTRACT OF THE DISCLOSURE 4-imidazolidinones and methods for preparing same comprising reacting amino acid derivatives of the formula $$R-NH-\overset{O}{\underset{\|}{C}}-\overset{R}{\underset{H}{C}}-NHR$$

with formaldehyde in the presence of an acid agent. Such 4-imidazolidinones are useful as muscle relaxants.

---

The present invention relates to novel organic compounds, novel intermediates useful in the preparation thereof and to novel processes useful in the preparation of said novel organic compounds.

The novel organic compounds to which the present invention relates are novel 4-imidazolidones. The novel intermediates useful in the preparation thereof are novel amino acid derivatives. The novel process aspect of the present invention involves preparing the said novel 4-imidazolidones from the said novel amino acid derivatives.

More particularly, the novel 4-imidazolidones of the present invention are of the formula $$\underset{R_1-N3\ \ 1N-R_2}{\overset{O=\boxed{4\ \ 5}-R_3}{}}$$

I wherein
$R_1$ is selected from the group consisting of hydrogen, lower alkyl, lower alkenyl, mono-heterocyclic-lower alkyl,

[structures showing substituted phenyl groups with $R_6, R_7, R_8, R_9, R_{10}$ and NCO-lower alkyl, and $R_6, R_7, R_8, R_{11}$]

$R_2$ is selected from the group consisting of hydrogen, lower alkyl, lower alkenyl, nicotinoyl, lower acyl, halo-lower acyl, hydroxy-lower alkyl;

[structures showing substituted phenyl groups with $R_6, R_7, R_8$, and with $R_{11}$ and $R_{12}$, $R_{13}$ N-lower alkyl]

$R_3$ is selected from the group consisting of hydrogen, lower alkyl and

[structure showing substituted phenyl with $R_6, R_7, R_8$ and –lower alkyl]

preferably from the group consisting of hydrogen, lower alkyl and benzyl.

$R_6$, $R_7$ and $R_8$ are each selected from the group consisting of individually halogen, lower alkyl, hydrogen, benzoyl, lower alkoxy, substituted benzoyl, hydroxy, lower acyl, lower acyl amino, amino, sulphamyl, trifluoromethyl and nitro and, taken together, lower alkylenedioxy, $R_9$ and $R_{10}$ are each selected from the group consisting of hydrogen and lower alkyl.

$R_{11}$ is selected from the group consisting of oxy lower alkyl, lower alkyl, halo-substituted lower alkyl, hydroxy-substituted $C_2$–$C_7$ alkyl, carbonyl and sulfonyl and;

$R_{12}$ and $R_{13}$ are selected from the group consisting of individually hydrogen and lower alkyl and taken together, a heterocyclic ring structure, preferably, a monoheterocyclic ring structure, at least one of $R_{12}$ and $R_{13}$ being other than hydrogen.

The term "lower alkyl," as used herein is intended to connote a straight or branched chain hydrocarbon group, such as methyl, ethyl, propyl, isopropyl, butyl and the like. The term "lower alkenyl" as used herein represents a branched or straight chained unsaturated hydrocarbon group such as allyl and methylallyl. The term "halogen" is intended to connote all four forms thereof, e.g., chlorine, fluorine, bromine and iodine. The expression "lower acyl," as used herein connotes, lower alkyl carbonyl groups such as acetyl, propionyl and the like. The term "lower alkoxyl" as employed herein is intended to designate a straight or branched hydrocarbon-oxy chain, such as methoxy, ethoxy, 1-methylethoxy and the like. As an example of a lower alkylenedioxy group is methylenedioxy. Preferably, when $R_6$ and $R_7$ together are lower alkylenedioxy, $R_8$ is hydrogen. Also, when $R_6$ is benzoyl or substituted benzoyl, at least one of $R_7$ and $R_8$ is preferably hydrogen. Representative of substituted benzoyl groups are p-chlorobenzoyl and the like. Advantageously, as is noted above, the heterocyclic group mentioned above, is suitably a monoheterocyclic ring structure including at the most, one further hetero atom selected from the group consisting of nitrogen and oxygen. However, it is preferred that a single hetero atom be contained in the ring. Advantageously, 5 or 6 atoms are contained in the ring structure which may be saturated or unsaturated. Thus, the expression "heterocyclic" includes a group such as, for example, pyridyl, piperidyl and the like. Similarly, the expression, "heterocyclic lower alkyl" includes a group such as pyridylmethyl, piperidylmethyl, pyridylethyl, piperidylethyl and the like and is advantageously an N-substituted heterocyclic lower alkyl group. The term "oxy lower alkyl" includes a group such as —O—$(CH_2)_n$ wherein $n$ is a whole integer from 1–7 or a group such as oxypropylene and the like. Representative of a $$\underset{R_{13}}{\overset{R_{12}}{\diagdown}}N\text{-lower alkyl}$$

group wherein $R_{12}$ and $R_{13}$ do not comprise a ring structure is dimethylaminomethyl, ethylaminomethyl and the like.

Also included within the purview of the present invention, as noted above, are the pharmaceutically acceptable salts of compounds having the Formula I above. Compounds of Formula I above form acid addition salts with pharmaceutically acceptable inorganic and organic acids such as hydrochloride acid, sulfuric acid, phosphoric acid, nitric acid, tartaric acid, salicylic acid, toluene sulfonic acid, maleic acid, succinic acid, formic acid, acetic acid and the like.

Compounds of Formula I, as is similarly noted above, also form quaternary salts with conventional quaternizing agents such as lower alkyl and lower alkenyl halides, e.g., ethyl bromide, methyl iodide, allylbromide and di-lower alkyl sulfates such as dimethyl sulfate utilizing conventional quaternizing techniques. An example of a quaternary salt is 1-methyl-3-(3′,4′-dimethoxy phenyl)-4-imidazolidone bromomethylate.

Compounds of Formula I above are prepared by reacting the said amino acid derivatives of the formula:

II wherein $R_1$, $R_2$ and $R_3$ have the same meaning as ascribed thereto herein above with formaldehyde, preferably, disposed in an aqueous medium, and an acid agent. In a preferred process aspect of the present invention, the reaction is effected in the presence of the acid agent, suitably, a proton-containing acid agent, preferably formic acid. In an alternate process aspect of the present invention, compounds of Formula II above can be reacted with formaldehyde, preferably disposed in an aqueous medium and the isolatable intermediate so obtained which is of the formula

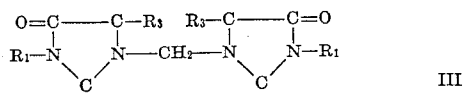
III wherein $R_1$ and $R_3$ are as above can be cleaved with the said acid agent, preferably a mineral acid, advantageously, hydrochloric acid, with or without the isolation thereof. Thus, the corresponding compound of Formula I above wherein $R_2$ is hydrogen is obtained. Compounds of Formula III above are novel and thus, constitute a part of the present invention.

Compounds of Formula II above wherein $R_1$ is selected from the group consisting of hydrogen, lower alkyl, lower alkenyl, monoheterocyclic lower alkyl;

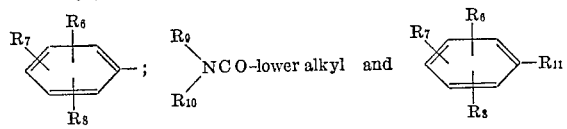

$R_2$ is selected from the group consisting of hydrogen, lower alkyl, lower alkenyl, nicotinoyl, lower acyl, halo-lower acyl, hydroxy-lower alkyl;

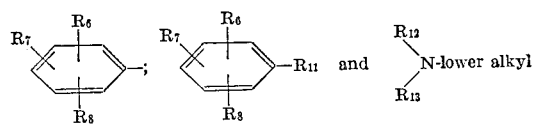

$R_3$ is selected from the group consisting of hydrogen, lower alkyl and

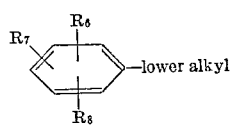

$R_6$, $R_7$ and $R_8$ are each selected from the group consisting of individually halogen, lower alkyl, hydrogen, lower alkoxy, hydroxy, lower acyl, lower acyl amino, amino, sulphamyl, trifluoromethyl and taken together, lower alkylenedioxy;

$R_9$ and $R_{10}$ are each selected from the group consisting of hydrogen and lower alkyl; $R_{11}$ is selected from the group consisting of oxy lower alkyl, lower alkyl, halo-substituted lower alkyl, hydroxy-substituted $C_2$–$C_7$ alkyl, carbonyl and sulfonyl and;

$R_{12}$ and $R_{13}$ are selected from the group consisting of individually hydrogen and lower alkyl and taken together, a heterocyclic ring structure, preferably a mono-heterocyclic ring structure, wherein at least one of $R_{12}$ and $R_{13}$ is other than hydrogen, are novel and thus, also constitute a part of the present invention.

Representative of acid agents suitable for the purposes of the present invention are proton-containing organic acid agents, such as oxalic acid, maleic acid, fumaric acid, succinic acid, citric acid, tartaric acid and most preferably, formic acid; mineral acids, such as hydrohalic acids, e.g. hydrochloric acid, sulphuric acid, nitric acid, phosphoric acid and the like and acid salts. Especially preferred among the acid agents enumerated above is formic acid.

When formic acid is utilized as the acid agent in the treatment of a compound of Formula II above wherein $R_2$ represents hydrogen in one process aspect of the present invention, the corresponding compound of Formula I above results wherein $R_2$ is methyl. When an acid agent other than formic acid is utilized in another advantageous process aspect of the present invention in the treatment of a compound of Formula II above wherein $R_2$ is hydrogen, the corresponding compound of Formula I above obtained from such a preparative procedure similarly contains hydrogen at $R_2$. If a mineral acid is employed, it is preferred that it be hydrochloric acid.

While reaction conditions can vary within wide limits, the conversion of compounds of Formula II to the corresponding compounds of Formula I proceeds preferably in the presence of any suitable conveniently available medium. While temperature and pressure are not critical, it is preferred to operate at from about room temperature to about the reflux temperature of the reaction medium, more preferably at slightly elevated temperatures, i.e., above about 30° C.

Compounds of Formula I above wherein $R_2$ is hydrogen and $R_1$ is other than a hydrogen can be converted into corresponding compounds wherein $R_2$ is lower alkyl by the reaction thereof with suitable alkylating agents such as an alkali metal halide or a dilower alkyl sulfate, e.g., dimethyl sulphate, preferably in the presence of a caustic, e.g. potash. Similarly, those compounds of Formula I above wherein $R_2$ is hydrogen can be reacted with any conventional acylating agent such as halide or an anhydride of a lower alkanoic acid, e.g., acetyl chloride or acetic anhydride whereby to form the corresponding compound wherein $R_2$ is lower acyl or with an aroyl halide, e.g. benzoyl chloride, nicotinoyl chloride, or substituted derivatives thereof, e.g. p-chlorobenzoyl chloride, whereby to form the corresponding compound wherein $R_2$ includes an aroyl radical. Compounds of Formula I above wherein $R_2$ is a benzyl group or a substituted benzyl group can be debenzylated by conventional debenzylating techniques, e.g., hydrogenation, preferably in the presence of a conventional hydrogenation catalyst such as palladium and the like according to known procedures whereby to form the corresponding compound of Formula I above wherein $R_2$ is hydrogen.

Compounds of Formula I above wherein $R_2$ is hydrogen can be further reacted with ethylene oxide or a substituted ethylene oxide compound, e.g., dichlorophenyl ethylene oxide or methyl ethylene oxide, preferably, in the presence of an inert organic solvent such as a lower alkanol, e.g., ethanol and at elevated temperatures, for example, at about the reflux temperature of the organic solvent whereby compounds of Formula I above containing, for example, at $R_2$, the group hydroxy-substituted lower alkyl or the group

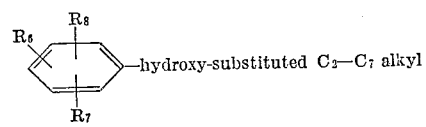

can be obtained.

Compounds of Formula II above utilized as the starting material in the novel process aspect of the present invention can be prepared for example employing N,N′-dicyclohexylcarbodiimide in accordance with the procedure specified in J. Am. Chem. Soc., 77, 1067 (1955), and in J. Org. Chem. 27, 4675 and 3788 (1962). Thus, when a compound of the formula R'NH₂ wherein R₁ is as above is reacted with a compound of the formula

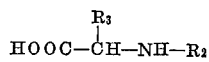

wherein R₂ and R₃ are as above in the presence of N,N'-dicyclohexylcarbodiimide utilizing the techniques set out in said last-mentioned articles, the desired compounds of Formula II above are obtained.

Compounds of Formula I above and their pharmaceutical salts, whether they be acid addition salts or quaternary salts are useful as muscle relaxants. They can be administered internally, for example, parenterally or enterally in conventional pharmaceutical dosage forms with dosage adjusted to individual needs. For example, they can be incorporated in conventional liquid or solid vehicles, such as water, gelatin, lactose, starch, magnesium stearate, talc, vegetable oils, gums, polyalkyleneglycols, and the like, to provide tablets, elixers, dragees, suppositories, suspensions, capsules, solutions, emulsions and the like according to accepted pharmaceutical practice. If necessary, they may be sterilized and/or contain suitable additives such as preserving, stabilizing, wetting or emulsifying agents. Additionally, other therapeutically valuable materials may be utilized therewith.

Especially advantageous as muscle relaxants are 3-(2'-benzoyl - 4' - chlorophenyl) - 4 - imidazolidone and 3-(3',4'-dimethoxyphenyl)-4-imidazolidone. An especially advantageous antirheumatic agent is 3-(3'-chlorophenyl)-4-imidazolidone.

The following examples are illustrative but no limitative of the present invention. All temperatures are in degrees centigrade.

Example 1

To a mixture of 50 g. of crude amino-veratrole (3,4-dimethoxy aniline) and 75 g. of N-carbobenzoxy-glycine in 200 ml. of dioxane, there is added dropwise at 20–30° C. with stirring, a solution of 87 g. of N,N'-dicyclohexylcarbodiimide in dioxane. The resultant mixture is left to stand for 3 hours at room temperature. After removal of crystalline dicyclohexylurea which forms, the dioxane solution is evaporated to dryness in a vacuum. The residue is added to acetone and the resultant solution is consecutively boiled (3×) under reflux conditions. On evaporation of the acetone solution, N-(N'-carbobenzoxy-glycyl)-3,4-dimethoxyaniline of M.P. 123–126° C. crystallizes out.

Example 2

50 g. of N-(N'-carbobenzoxyglycyl)-3,4-dimethoxyaniline is added to 200 ml. of 33 percent hydrogen bromide solution in glacial acetic acid and the resultant mixture is left to stand overnight. A precipitate which forms is filtered off under suction. After the mother liquors are completely removed, the precipitate remaining on the filter is washed with ether and then with a small amount of cold acetone, yielding N-glycyl-3,4-dimethoxyaniline hydrobromide, M.P. 229–231° C.

The salt is converted into the free base by dissolving the same in a five-fold amount of water. A small amount of decolorizing charcoal is added to the resultant solution and the so-formed mixture is agitated. After removal of the charcoal by filtration, the filtrate is made phenolphthalein-alkaline with conc. caustic soda. The base which results is extracted with chloroform. After evaporation of the chloroform in a vacuum, the residue is made into a paste with ether and agitated for a short time. The base then separates in the form of crystals and is filtered off under suction. It is then washed on the filter with a small amount of ether yielding N-glycyl-3,4-dimethoxyaniline of M.P. 141–143°.

Example 3

N-glycyl-3,4-dimethoxyaniline is also obtained by removal of the carbobenzoxy group of the compound in Example 1 hydrogenolytically. To achieve this end, a solution of 92 g. of N-(N'-carbobenzoxyglycyl)-3,4-dimethoxyaniline in 800 ml. of methanol is saturated with hydrogen in the presence of 30 g. of 5 percent palladium/carbon, with stirring. After cessation of the CO₂- evolution and after separation of the catalyst by filtration, the filtrate is acidified with ethanolic hydrochloric acid and concentrated in a vacuum, yielding crystalline N-glycyl-3,4-dimethoxyaniline hydrochloride as a precipitate. The hydrochloride is recrystallized from methanol and is found to have a melting point of 241°. The hydrochloric acid salt of N-glycyl-3,4-dimethoxyaniline can be converted to the free base in the manner described in Example 2.

Example 4

To a solution containing 9.2 g. of 3,4-dimethoxyaniline in 35 ml. of dioxane and 10 g. of N-benzylglycine in 130 ml. of dioxane, there is added dropwise at room temperature with stirring, 20 g. of N,N-dicyclohexylcarbodiimide in 35 ml. of dioxane. After the reaction mixture is left to stand overnight at 0° C., dicyclohexylurea separates out and is removed. Evaporation of dioxane in a vacuum and treatment of the residue from such evaporation with petroleum ether yields crystalline N-(N'-benzylglycyl)-3,4-dimethoxyaniline, M.P. 90° C.

Example 5

10.5 g. of N-glycyl-3,4-dimethoxyaniline are added to 5.3 g. of benzaldehyde in 100 ml. of xylene. The resultant mixture is boiled under reflux conditions. After azeotropic separation of the water which forms, the reaction medium is found to contain N-(N'-benzylideneglycyl)-3,4-dimethoxyaniline which is reduced without isolation to the N-(N'-benzyl-glycyl)-3,4-dimethoxyaniline with NaBH₄ in methanol. To this effect 1.9 g. of NaBH₄ and 20 ml. of methanol are added in portions and with stirring, to the reaction mixture over a period of 2 hours. After standing over night, the reaction mixture is concentrated under reduced pressure, the residue made acid with hydrochloric acid and extracted with ether. The acid solution is made alkaline with ammonia and the base is taken up with chloroform. Upon removal of the chloroform by evaporation, the N-(N'-benzylglycyl)-3,4-dimethoxyaniline is obtained in the form of an oily liquid.

Example 6

30 g. of N-glycyl-3,4-dimethoxyaniline was heated for a period of 4 hours at 75° C. together with 250 ml. of 38 percent aqueous formaldehyde solution and the same amount of 100 percent formic acid. The reaction solution was evaporated to dryness in a vacuum. The residue, after the addition of water, was made phenolphthaleinalkaline with conc. ammonia yielding 1-methyl-3-(3',4'-dimethoxy-phenyl)-4-imidazolidone. The reaction medium was extracted three times with chloroform to remove the base. The chloroform extracts were combined and washed with a small amount of water. The extracts were then evaporated, and the residue, in acetone, converted into the hydrochloride with an excess of ethanolic hydrochloric acid solution, thereby obtaining 1-methyl-3-(3',4'-dimethoxyphenyl)-4-imidazolidone hydrochloride which spontaneously crystallizes from acetone, M.P. 197°.

Example 7

21 g. of N-glycyl-3,4-dimethoxyaniline were added with stirring to 11 ml. of 38 percent aqueous formaldehyde solution. The temperature of the reaction mixture rose to 36°. The reaction mixture was then heated for 30 minutes on a water-bath and, after cooling, treated with 120 ml. of aqueous hydrochloric acid (2:1). After evaporation of the so-formed solution in a vacuum, the residue was recrystallized from alcohol/ether, yielding the hydrochloride of 3-(3',4'-dimethoxyprenyl)-4-imidazolidone, M.P. 163–164°. The corresponding base, 3-(3',4'-dimethoxyphenyl)-4-imidazolidone is obtained by dissolving the hydrochloride in cold water, making the resulting solution alkaline by addition of ammonia, separating the resulting precipitate (free base) by filtration, taking up the precipitate in ether, washing the ethereal solution with water and removing the ether by distillation under reduced pressure.

From the reaction mixture obtained by the above reaction of N-glycyl-3,4-dimethoxy-aniline with formaldehyde, an intermediate, N,N'-methylene-bis-3-(3',4'-dimethoxyphenyl)-4-imidazolidone, M.P. 186–187°, may be obtained by allowing the reaction mixture to cool off, filtration and crystallisation of the filter residue from acetonitrile.

Example 8

1 - benzyl-3-(3',4'-dimethoxyphenyl-imidazolidone was obtained upon heating crude non-crystalline N-(N'-benzyl-glycyl)-3,4-dimethoxyaniline as prepared in Example 5 with formaldehyde and formic acid in the manner set out in Example 6. The hydrochloride was prepared also in the manner set out in Example 6 and was found to have a melting point of 187°

Example 9

1 g. of the 1-benzyl-3-(3',4'-dimethoxyphenyl)-4-imidazolidone hydrochloride as prepared in Example 8 was hydrogenated in methanol in the presence of palladium/carbon. Upon removal of the catalyst by filtration, concentration of the filtrate to dryness and crystallization of the residue from ethanol, there was obtained 3-(3',4'-dimethoxyphenyl)-4-imidazolidone hydrochloride of M.P. 163–164° which is identical with the compound described in Example 7.

Example 10

The quaternary salt, 1-methyl-3-(3',4'-dimethoxyphenyl)-4-imidazolidone bromomethylate, M.P. 215°, crystallizes upon treating 1-methyl-3-(3',4'-dimethoxyphenyl)-4-imidazolidone with methyl bromide in acetone.

Example 11

On boiling, 13.8 g. of 3-(3',4'-dimethoxyphenyl)-4-imidazolidone under reflux conditions for 2 hours with 140 ml. of acetic anhydride, evaporating the reaction mixture to dryness, suspension of the residue in acetic ester, washing with water, evaporation to dryness and crystallization from acetone, there were obtained 12 g. of the 1-acetyl derivative of M.P. 157–158°.

Example 12

11 g. of 3-(3',4'-dimethoxyphenyl)-4-imidazolidone was suspended in 60 ml. of dimethylformamide and heated at 100° for 20 hours with stirring after addition to the suspension of 7.8 g. of ethyl iodide and 7.0 g. of potash. Upon evaporation of the reaction mixture to dryness, taking up the resinous residue in acetic ester, washing with water, evaporation of the acetic ester, dissolving the residue in ethanolic hydrochloric acid and evaporation to dryness, there was obtained 1-ethyl-3-(3',4'-dimethoxyphenyl)-4-imidazolidone hydrochloride of M.P. 197–198°.

Example 13

15.6 g. of 3-(3',4'-dimethoxyphenyl)-4-imidazolidone were boiled at reflux for 20 hours together with 26.5 g. of 3,4-dichlorophenyl-ethylene oxide in 70 ml. of ethanol. After evaporation of the alcohol in a vacuum, the residue was crystallized from ethanol-ether, yielding 1-[2-(3',4'-dichlorophenyl) - 2 - hydroxyethyl] - 3 - (3'',4'' - dimethoxyphenyl)-4-imidazolidone of M.P. 135–136°. M.P. of the hydrochloride: 179–180°.

Example 14

The 1-(3'-o-toluyloxy-2'-hydroxypropyl)-3-(3'',4''-dimethoxyphenyl)-4-imidazolidone of M.P. 93–94° was obtained as in Example 13 from 3-(3',4'-dimethoxyphenyl)-4-imidazolidone and o-toluyloxy-1,2-epoxy-propane. M.P. of the hydrochloride: 149–150° C.

Example 15

(β-Phenylalanyl)-3,4-dimethoxyaniline was obtained in the form of an oil by hydrogenolysis of d,1-N-(N'-carbobenzoxy- β - phenylalanyl) - 3,4-dimethoxyaniline (M.P. 155–156°) utilizing the procedure set out in Example 3. 3-(3',4'-dimethoxyphenyl)-5-benzyl-4-imidazolidone hydrochloride was obtain from the first-mentioned compound by reaction thereof with formaldehyde in the presence of hydrochloric acid in a manner analogous to that set out in Example 7. M.P. of the hydrochloride: 202° C.

Example 16

1 - methyl - 3 - (3',4' - dimethoxyphenyl) - 5 - benzyl-4-imidazolidone, the hydrobromide of which melts at 185°, was obtained by the reaction of the oily crude (β-phenylalanyl)-3,4-dimethoxyaniline (obtained as in Example 15) with formaldehyde and formic acid according to the method set out in Example 6.

The same compound was obtained by the reaction of 9 g. of 3-(3',4'-dimethoxyphenyl)-5-benzyl-4-imidazolidone with 9 ml. of formaldehyde followed by reduction by addition of 10 g. of Raney nickel and 10 ml. of methanol, subsequent filtration and evaporation of methanol.

Example 17

A solution of 55 g. of N,N'-dicyclohexylcarbodiimide in 175 ml. of dioxane was added slowly to a solution of 46 g. of aminoveratrole in 100 ml. of chloroform and 73 g. of carbobenzoxynorleucine in 200 ml. of chloroform so that the reaction temperature did not rise above 30° C. The resultant mixture is left to stand for 3 hours at room temperature. After removal of a precipitate which forms, the dioxane solution is evaporated to dryness. The residue is added to acetone and the resultant solution is consecutively boiled (3×) under reflux conditions. On evaporation of the acetone solution, N-(N'-carbobenzoxy-norleucyl)-3,4-dimethoxyaniline crystallizes out. On crystallization from ethanol, the product is found to have a melting point of 147°. By hydrogenolysis as in Example 3, there was obtained the noncrystalline norleucyl-3,4-dimethoxyaniline.

1 - methyl - 3 - (3',4' - dimethoxyphenyl) - 5 - n - butyl-4-imidazolidone hydrobromide of M.P. 155–156° C. was obtained by treatment of the so-formed norleucyl-3,4-dimethoxyaniline with formaldehyde and formic acid and subsequent salt formation according to the procedures set out in Example 6.

Example 18

21 g. of N-glycyl-3,4-dimethoxyaniline was boiled at reflux for 2 hours in 200 ml. of acetone to which there had been previously added 500 mg. of p-toluene-sulphonic acid. After evaporation in a vacuum, the residue was dissolved in methanol and hydrogenated in the presence of 5 g. of 5 percent palladium/carbon. After the calculated amount of hydrogen was taken up, the catalyst was removed on filtration and the filtrate was made alkaline with ethanolic hydrochloric acid. Upon evaporation in a vacuum, the N-(N'-isopropylglycyl)-3,4-dimethoxyaniline hydrochloride of M.P. 214–215° crystallized out.

The hydrochloride was converted to the base and the base was reacted with formaldehyde and formic acid as in Example 6. There was thus obtained 1-isopropyl-3-(3',4'-dimethoxyphenyl)-4-imidazolidone. The so-formed base was converted to the hydrochloride as in Example 6. M.P. of the hydrochloride: 193–194° C.

Example 19

As in Example 18, N-glycyl-3,4-dimethoxyaniline was reacted with methyl ethyl ketone and the Schiff's base resulting from such reaction was hydrogenated to N-(N'-secbutylglycl)-3,4-dimethoxyaniline (hydrochloride, M.P. 194–195° C.). The cyclization with formaldehyde and formic acid according to Example 6 gave 1-secbutyl-3-(3',4'-dimethoxyphenyl)-4-imidazolidone, M.P. of the oxalate: 156–157° C.

Further compounds of Formula I obtained from the corresponding substituted aminoacetyl compounds of Formula II according to the process in accordance with the invention are compiled in the following table:

Example 52

193 g. of 5-chloro-2-glycylaminobenzophenone (manufactured according to the procedure set forth in J. Org. Chem. 27, 4675 (1962)) was suspended in 940 ml. of methanol and treated with 200 ml. of a 38 percent formaldehyde solution. The reaction mixture is boiled under reflux for 2 hours. After cooling, the separated crystaline reaction product is filtered off under suction and washed on the filter with methanol yielding N,N'-methylene-bis-[3-(2'-benzoyl-4'-chlorophenyl)-4-imidazolidone] which melts at 213–215°. The so-formed substance is suspended in a mixture of methanol and ethanol and made congo-acid with ethanolic hydrochloric acid, whereby there re-

| Example | Starting Compound | $R_1$ | $R_2$ | $R_3$ | M.P. (° C.) of the hydrochloride, when not stated otherwise | Manufactured according to procedures of Example— |
|---|---|---|---|---|---|---|
| 20 | N-glycyl-p-chloroaniline | p-chloro-phenyl | $CH_3$ | H | 175 | 6 |
| 21 | N-glycyl-p-methoxyaniline | p-$CH_3$O-phenyl | $CH_3$ | H | 185 | 6 |
| 22 | N-glycyl-o-methoxyaniline | o-$CH_3$O-phenyl | $CH_3$ | H | 160–161 | 6 |
| 23 | N-glycyl-p-ethoxyaniline | p-$C_2H_5$O-phenyl | $CH_3$ | H | 148–149 | 6 |
| 24 | N-glycyl-m-methoxyaniline | m-$CH_3$O-phenyl | $CH_3$ | H | Tosylate, 135 | 6 |
| 25 | N-glycyl-p-nitroaniline | p-$NO_2$-phenyl | $CH_3$ | H | Base, 140–141; hydrobromide, 148–150. | 6 |
| 26 | N-glycly-3,4-methylenedioxybenzyl amine | 3,4-methylenedioxybenzyl | $CH_3$ | H | Base, 86–87; fumarate, 135–136. | 6 |
| 27 | N-glycyl-2,5-dimethyoxyaniline | 2,5-dimethoxyphenyl | $CH_3$ | H | Maleate, 110–120; hydrobromide, 165. | 6 |
| 28 | N-glycyl-2(3,4-dimethoxyphenyl)-ethylamine | 3,4-dimethoxyphenyl-2-ethyl | $CH_3$ | H | 134–135 | 6 |
| 29 | N-glycyl-butylamine | n-Butyl | $CH_3$ | H | Oxalate, 134–135 | 6 |
| 30 | N-glycyl-p-acetaminoaniline | p-Acetaminophenyl | $CH_3$ | H | 212–214 | 6 |
| 31 | N-glycyl-3,4-dichloroaniline | 3,4-dichlorophenyl | $CH_3$ | H | Base, 136; hydrochloride, 218–220. | 6 |
| 32 | N-glycyl-aniline | Phenyl | $CH_3$ | H | 188 | 6 |
| 33 | N-glycyl-p-sulphamylaniline | p-Sulphamylphenyl | $CH_3$ | H | Base, 212–213 | 6 |
| 34 | N-glycyl-(1-methyl-2-phenyl)ethylamine | 1-methyl-2-phenyl-ethyl | $CH_3$ | H | Hydrobromide, 148. | 6 |
| 35 | N-glycyl-diethylaminocarbonyl-methylamine | Diethylaminocarbonylmethyl | $CH_3$ | H | Oxalate, 115–117 | 6 |
| 36 | N-glycyl-p-fluoroaniline | p-Fluorophenyl | $CH_3$ | H | Hydrobromide, 161–162. | 6 |
| 37 | N-glycyl-p-hydroxyaniline | p-Hydroxyphenyl | $CH_3$ | H | Hydrobromide, 215. | 6 |
| 38 | N-glycyl-p-nitroaniline | p-$NO_2$-phenyl | H | H | Base, 243; hydrochloride, 209–210. | 7 |
| 39 | N-glycyl-3,4-dichloroaniline | 3,4-dichlorophenyl | H | H | 198–200 | 7 |
| 40 | N-glycyl-2,4-dichloroaniline | 2,4-dichlorophenyl | H | H | 270 | 7 |
| 41 | N-glycylaniline | Phenyl | H | H | 165 | 7 |
| 42 | N-glycyl-p-fluoroaniline | p-Fluorophenyl | H | H | 202–203 | 7 |
| 43 | N-glycyl-3-nitroaniline | 3-nitrophenyl | $CH_3$ | H | 187–188 | 6 |
| 44 | do | do | H | H | 201–200 | 7 |
| 45 | N-glycyl-3-chloroaniline | 3-chlorophenyl | H | H | 199–200 | 7 |
| 46 | N-glycyl-3-fluoromethylaniline | 3-fluoromethylphenyl | H | H | 193–194 | 7 |
| 47 | N-glycyl-3,4-dimethoxyaniline | 3,4-dimethoxyphenyl | Tosyl | H | Tosyl compound, 173–174. | ¹7 |
| 48 | N-glycyl-3,4-dimethoxyaniline | do | Dichloroacetyl | H | Dichloroacetyl compound, 146–147. | ²7 |
| 49 | N-glycyl-3,fluoromethylaniline | 3-fluoromethylphenyl | $CH_3$ | H | 170–171 | ³7 |

¹ Followed by treatment with p-toluene-sulfonyl-chloride.
² Followed by treatment with dichloroacetyl-chloride.
³ Followed by methylation.

Example 50

7.3 g. of 3-(p-nitrophenyl)-4-imidazolidone (product of Example 38) were hydrogenated in 100 ml. of methanol in the presence of 5 g. of a 5% palladium/carbon catalyst. Upon acidification of the reaction mixture with hydrochloric acid, the catalyst was removed by fitration and the filtrate concentrated to dryness. By crystallization of the residue from methanol there was obtained 3-(p-aminophenyl)-4-imidazolidone, the hydrochloride of which melts at 272°.

Example 51

10 g. of 3-(p-nitrophenyl)-4-imidazolidone were dissolved in 150 ml. of dioxane and the resulting solution, was treated with 7.3 g. of potash and 8 g. of p-chlorobenzoyl chloride, the latter being added dropwise with stirring. Stirring was continued at 60° for 15 hours. The precipitate formed was filtered off and washed with water. Upon recrystallization from acetonitrile/chloroform there was obtained 1-(p-chlorobenzoyl)-3-(p-nitrophenyl)-4-imidazolidone melting at 248–249°.

sults a clear solution which is concentrated in vacuum at 30° (bath temperature). The hydrochloride of 3-(2'-benzoyl-4'-chlorophenyl)-4-imidazolidone which separates is filtered off under suction and washed on the filter with acetone. M.P.: 162–183°. M.P. of the base: 125–126°.

Example 53

3 g. of 5-chloro-2-glycylamino-2'-fluorobenzophenone [manufactured according to the procedure set forth in J. Org. Chem. 27, 3788 (1962)] in 100 ml. of methanol are boiled under reflux for 3 hours together with 3 ml. of a 38 percent aqueous formaldehyde solution. After concentration in vacuum, the residue is treated with ether, separating out N,N'-methylene-bis-3-[2'-(2''-fluorobenzoyl)-4'-chloro]-phenyl-4-imidazolidone which melts at 199–200°. The latter substance is dissolved in a small amount of 3 N hydrochloric acid and ethanol and evaporated to dryness. The residue (M.P. 147°) melts at 151–152° after recrystallization from alcohol/ether and is 3-[2'-(2''-fluorobenzoyl)-4'-chloro-phenyl]-4-imidazolidone.

Example 54

11.1 g. of 3-(3',4'-dimethoxyphenyl)-4-imidazolidone, dissolved in 150 ml. methylethyl ketone, was reacted with 8 g. of nicotinoyl chloride in the presence of 6.9 g. of potash by heating the reaction mixture to 70° C. for 7 hours. The residue obtained on filtration was treated with 100 ml. of water, whereby 1 - nicotinoyl - 3 - (3',4'-dimethoxyphenyl)-4-imidazolidone separated in the form of colorless crystals which were filtered off and dried; M.P. 193°. The corresponding hydrochloride-hydrate melted at 233°.

Example 55

3-(2'-benzoyl-4'-chlorophenyl) - 4 -imidazolidone was encapsulated by conventional techinques into gelatin capsules. Each capsule contained:

| | Mg. |
|---|---|
| 3-(2'-benzoyl-4'-chlorophenyl)-4'- imidazolidone hydrochloride | 50 |
| Silicic acid | 50 |
| Manitol | 100 |

I claim:
1. A compound selected from the group consisting of compounds of the formula

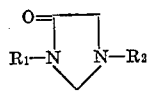

and pharmaceutically acceptable salts thereof wherein
$R_1$ is selected from the group consisting of pyridyl lower alkyl, piperidyl lower alkyl

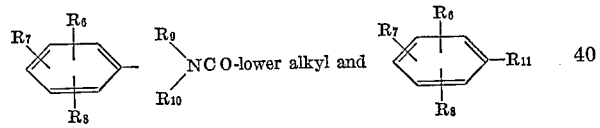

$R_2$ is selected from the group consisting of hydrogen, lower alkyl, lower alkenyl, nicotinoyl, lower alkanoyl, halo-lower alkanoyl, hydroxy-lower alkyl;

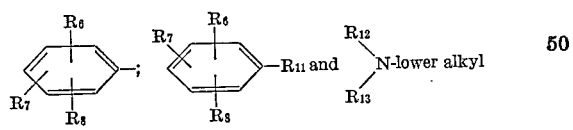

$R_6$, $R_7$ and $R_8$ are each selected from the group consisting of individually halogen, lower alkyl, hydrogen, benzoyl, lower alkoxy, halo-substituted benzoyl, hydroxy, lower alkanoyl, lower alkanoyl amino, amino, sulphamyl, trifluoromethyl and nitro and taken together, lower alkylene dioxy;
$R_9$ and $R_{10}$ are each selected from the group consisting of hydrogen and lower alkyl;
$R_{11}$ is selected from the group consisting of oxy-lower alkyl, lower alkyl, halo-substituted lower alkyl, hydroxy-substituted-$C_2$-$C_7$ alkyl, carbonyl and sulfonyl and;
$R_{12}$ and $R_{13}$ are selected from the group consisting of individually hydrogen and lower alkyl and taken together, pyridyl and piperidyl, at least one of $R_{12}$ and $R_{13}$ being other than hydrogen.
2. 3-(2'-benzoyl-4'-halophenyl)-4-imidazolidone.
3. 3-(2'-benzoyl-4'-chlorophenyl)-4-imidazolidone.
4. 3-(3',4'-dimethoxyphenyl)-4-imidazolidone.
5. 3-(3'-halophenyl)-4-imidazolidone.
6. 3-(3'-chlorophenyl)-4-imidazolidone.

7. A compound of the formula

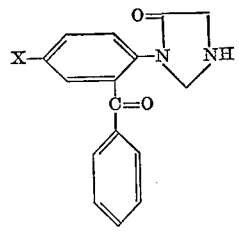

wherein X is selected from the group consisting of halogen and nitro.
8. A process for the preparation of a compound of the formula

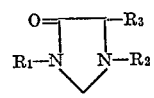

wherein
$R_1$ is selected from the group consisting of hydrogen, lower alkyl, lower alkenyl, pyridyl lower alkyl, piperidyl lower akyl

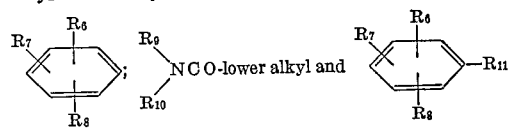

$R_2$ is selected from the group consisting of hydrogen, lower alkyl, lower alkenyl, nicotinoyl, lower alkanoyl, halo-lower alkanoyl, hydroxy-lower alkyl

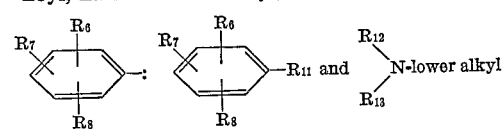

$R_3$ is selected from the group consisting of hydrogen, lower alkyl and

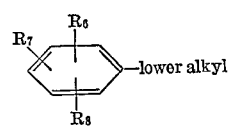

$R_6$, $R_7$ and $R_8$ are each selected from the group consisting of individually halogen, lower alkyl, hydrogen, benzoyl, lower alkoxy, halo-substituted benzoyl, hydroxy, lower alkanoyl, lower alkanoyl amino, amino, sulphamyl, trifluoromethyl and nitro and taken together, lower alkylenedioxy;
$R_9$ and $R_{10}$ are each selected from the group consisting of hydrogen and lower alkyl;
$R_{11}$ is selected from the group consisting of oxy-lower alkyl, lower alkyl, halo-substituted lower alkyl, hydroxy-substituted $C_2$–$C_7$ alkyl, carbonyl and sulfonyl and;
$R_{12}$ and $R_{13}$ are selected from the group consisting of individually, hydrogen, and lower alkyl, and taken together, pyridyl and piperidyl, at least one of $R_{12}$ and $R_{13}$ being other than hydrogen.
which comprises reacting a compound of the formula

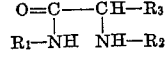

wherein $R_1$, $R_2$ and $R_3$ are as above with formaldehyde and an acid agent.
9. A process as defined in claim 8 wherein the reaction with formaldehyde is effected in the presence of the said acid agent.
10. A process as defined in claim 9 wherein formic acid is employed as the acid agent.
11. A process as defined in claim 8 wherein the reaction is first effected with formaldehyde and thereafter with the said acid agent.

12. A process as defined in claim 11 wherein a mineral acid is employed as the acid agent.

13. A process as defined in claim 12 wherein hydrochloric acid is employed as the acid agent.

References Cited

UNITED STATES PATENTS 2,877,179   3/1959   Hughes _____ 260—309.7

OTHER REFERENCES

Chemical Abstracts Subject Index (1–Z) vol. 56, p. 1143S (1962).

Edward et al.: Chem. and Ind. 1954, pp. 193–4.

Hofmann: Imidazole and Its Derivatives Part I, p. 242, N.Y. Interscience, 1953.

Schipper et al.: In: Elderfield Heterocyclic Compounds, vol. 5, p. 254, N.Y., Wiley, 1957.

Shimomura et al.: Chemical Abstracts, vol. 56, column 7299 (1962).

Whalley et al.: Jour. Amer. Chem. Soc., vol. 77, pp. 745–49 (1955).

HENRY R. JILES, *Primary Examiner.*

NATALIE TROUSOF, *Assistant Examiner.*

U.S. Cl. X.R.

260—293.4, 294, 294.8, 295, 295.5, 340.5, 471, 556, 558, 559, 561, 562, 999

PO-1050
(5/69)

UNITED STATES PATENT OFFICE
CERTIFICATE OF CORRECTION

Patent No. 3,428,646          Dated February 18, 1969

Inventor(s) Joseph Hellerbach

It is certified that error appears in the above-identified patent and that said Letters Patent are hereby corrected as shown below:

Column 7, line 21 "-dimethoxyphenyl-" should read

-dimethoxyphenyl)-4-

SIGNED AND
SEALED
JUN 23 1970

(SEAL)
Attest:

Edward M. Fletcher, Jr.
Attesting Officer

WILLIAM E. SCHUYLER, JR.
Commissioner of Patents